United States Patent
Heine et al.

(10) Patent No.: US 6,554,153 B1
(45) Date of Patent: Apr. 29, 2003

(54) STORAGE POCKET (MAP WALLET)

(75) Inventors: Daniel Heine, Dornstetten (DE); Ruediger Widulle, Munich (DE)

(73) Assignees: fischerwerke Artur Fischer GmbH & Co. KG., Waldachtal (DE); Bayerische Motoren Werke AG, Munich (DE)

(*) Notice: Subject to any disclaimer, the term of this patent is extended or adjusted under 35 U.S.C. 154(b) by 0 days.

(21) Appl. No.: 09/650,835

(22) Filed: Aug. 30, 2000

(30) Foreign Application Priority Data

Sep. 4, 1999 (DE) ......................................... 199 42 355

(51) Int. Cl.[7] ............................................. B65D 25/10
(52) U.S. Cl. ...................................................... 220/578
(58) Field of Search ........................ 220/578; 224/281, 224/282

(56) References Cited

U.S. PATENT DOCUMENTS 2,392,604 A * 1/1946 Mallory ...................... 220/578
4,915,273 A * 4/1990 Allen ......................... 224/281

FOREIGN PATENT DOCUMENTS

| AT | 110250 | * | 7/1928 | ................. 220/578 |
| FR | 2239109 | * | 2/1975 | ................. 220/578 |

* cited by examiner

Primary Examiner—Stephen Castellano
(74) Attorney, Agent, or Firm—Michael J. Striker

(57) ABSTRACT

A storage pocket for storing flat items in a motor vehicle, has a support for flat items; a pressure element; a guide provided for guiding said pressure element and guiding said pressure element back and forth between a position close to said support or abutting said support and a position spaced from said support; a force-applying spraying element which presses said pressure element toward said support; and a holding device which holds said pressure element against a force of said force-applying spraying element releasably in the position spaced from the support.

1 Claim, 3 Drawing Sheets

STORAGE POCKET (MAP WALLET)

BACKGROUND OF THE INVENTION

The present invention relates to a storage pocket (map wallet) for storing flat items, such as road maps, in a motor vehicle.

Storage pockets in motor vehicles are known in many different forms and arrangements. It is believed that the existing storage pockets can be improved.

SUMMARY OF THE INVENTION

Accordingly, it is an object of the present invention to provide a storage pocket, especially in a motor vehicle, which is formed so that it is simple to manipulate and requires little space when not being used.

In keeping with these objects, one feature of present invention resides, briefly stated, in a storage pocket which has a support for the flat items. This support can be, for example, a side wall, such as the inner cladding of a door of a motor vehicle, or a side wall of a container installed in a motor vehicle or housed in the motor vehicle. Moreover, the storage pocket according to the invention comprises a pressure element, for example in panel form, which is guided movably back and forth by means of a guide between a position close to the support of the storage pocket or abutting the support and a positions paced from the support. A force-applying spring element presses the pressure element in the direction of the support of the storage pocket, so that, when the storage pocket is being used, items lying between the support and the pressure element are gripped between the pressure element and the support. When the container is not in active use, the force-applying spring element pressure the pressure element towards the support, the pressure element preferably lying flat against the support so that the storage pocket requires little space.

In accordance with the present invention, one a holding device, which holds the pressure element releasably in the position spaced from the support against the force of the force-applying spring element. The holding device simplifies the insertion of flat items into the storage pocket. To insert the flat items, the pressure element is brought against the force of the force-applying spring element into spaced relationship with the support and this spaced position is maintained by the holding device. The pressure element can now be let go, and the flat items are inserted between the support and the pressure element into the storage pocket according to the invention. The holding device is then released and the force-applying spring element presses the pressure element towards the flat items inserted in the storage pocket, so that the inserted items are held gripped between the pressure element and the support of the storage pocket according to the invention. Metal spring elements know per se, such as leaf springs, leg springs, helical pressure, tension or torsion spring elements, rubber springs or rubber cords and so on, can be used as the force-applying spring element.

In accordance with a further feature of present invention space-saving construction of the storage pocket a recess is provided, in which, when the container is not in use, the pressure element lies in the position abutting the support.

In the storage compartment in accordance with one form of the invention pressure element, for example in panel form, can be pivotally guided away from the support of the storage pocket, for example, about a pivot axis that runs parallel to the lower edge of the pressure element. One form of the invention provides for a parallel guidance of the pressure element, wherein parallel guidance within the meaning of the invention need not necessarily be limited strictly to an exact parallel guidance, but is also intended to include angular departures therefrom of the pressure element.

Finally, in accordance with a preferred form of the storage container in accordance with the present invention for substantially parallel guidance of the pressure element, with which the pressure element slidingly guided. Another embodiment of the invention provides a guide means for the pressure element with pivoted levers, for example a parallelogram guide means.

Finally in accordance with the preferred form of the storage container in accordance with the present invention, the guide means for the pressure element is at the same time in the form of a holding device, which holds the pressure element in the position spaced from the support of the storage pocket against the force of the force-applying spring element. The construction as a holding device can, where the guide means of the pressure element has guideways, can be produced in that the guideways extend at a distance from the support of the storage pocket substantially at right angles to the direction of action of the force-applying spring element. If the pressure element takes up its position spaced from the support, the pressure element is located at a point of the guideways at which the guideways extend at right angles to the line of application of the force-applying spring element, and hence block the pressure element against displacement by the force-applying spring element. The end portions of the guideways remote from the support can also extend in such a way that the force-applying spring element presses the pressure element against closed ends of the end portions of the guideways.

For release, the pressure element is brought against the force of the force-applying spring element into the part of the guideways in which the force-applying spring element presses the pressure element against the support. When the pressure element is guided using pivoted levers, the pivoted levers can be arranged so that, when the pressure element is located in its position spaced from the support of the storage pocket, they run parallel tot he direction of action of the force-applying spring element and hence block the pressure element against movement by the force-applying spring element. The pivoted levers can also be arranged so that they are pressured by the force-applying spring element against a stop limiting their pivoting angle when the pressure element takes up its positions paced from the support. Another possible way of holding the pressure element against the force of the force-applying spring element in the position spaced from the support of the storage pocket is to provide a so-called push-push or cardioid locking device known per se to the skilled person.

A sliding guide and a pivoted lever guide can also be combined for guidance of the pressure element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
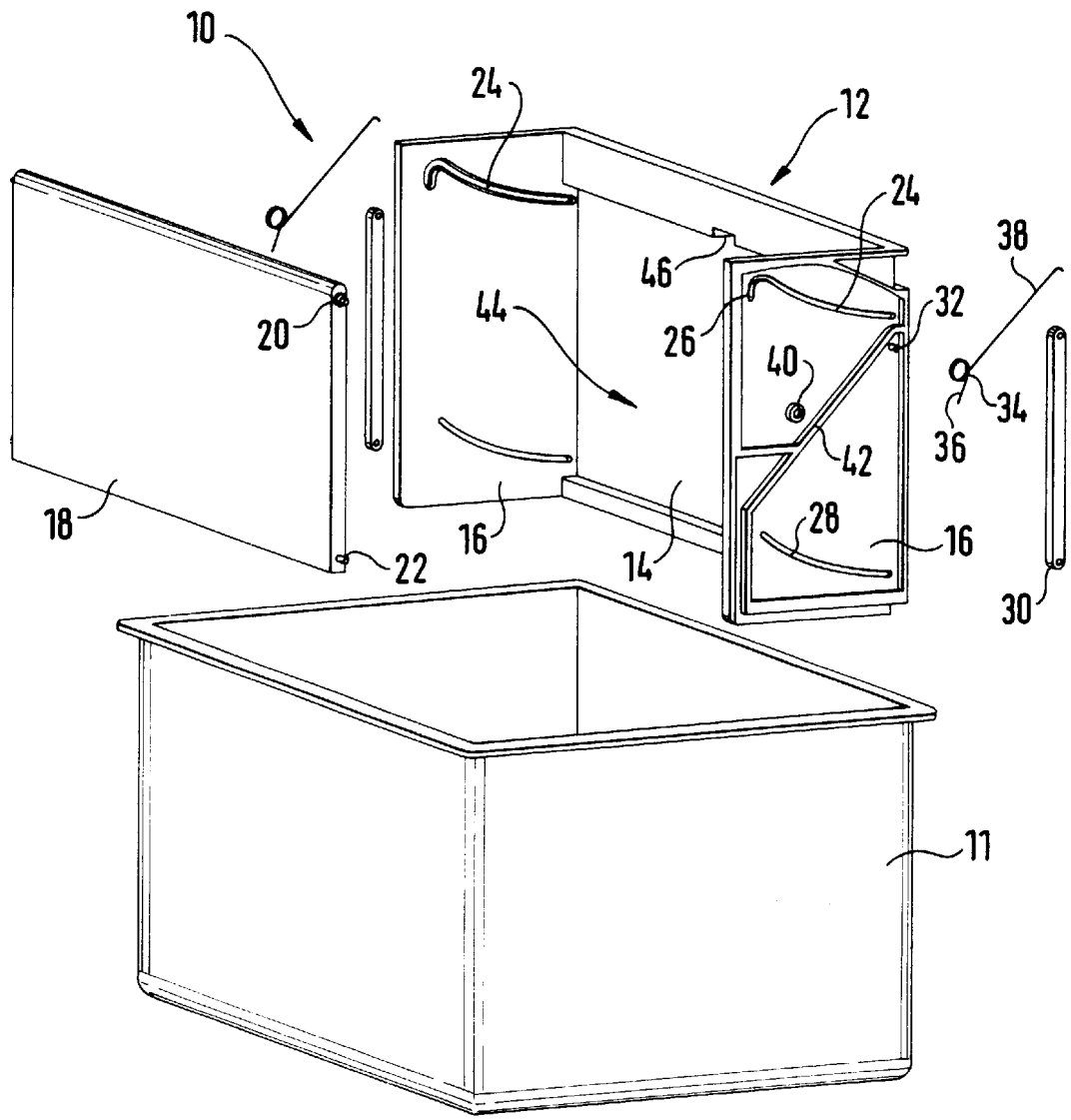
FIG. 1 shows an exploded perspective view of a storage pocket according to the invention.

A storage pocket 10 according to the invention shown in FIG. 1 is in the form of a map wallet for storage of road maps and street plans or similar flat items in a motor vehicle. The storage pocket 10 can be integrated, for example, in the cladding of a door. In the exemplary embodiment illustrated, the storage pocket 10 is provided for insertion in a box-shaped larger container 11 open at the top, which in turn can be housed in a motor vehicle, not shown.

The storage pocket 10 has a base part 12 with a side wall 14, from the two ends of which two shorter end walls 16 extend at right angles. The side wall 14 forms a support, also denoted by the reference number 14, for the road-maps and street plans to be stored, not shown. Moreover, the storage pocket 10 comprises a panel-form, rectangular pressure element 18, which has laterally projecting guide pins 20, 22 close to its upper and lower edge. By means of the upper guide pin 20, the pressure element 18 is slidingly guided in guideways 24, which are in the form of slots and are arranged in an upper region of the end walls 16 of the base part 12. The guideways 24 run in an arc initially substantially at right angles away from the side walls 14 upward and at the end, at a distance from the side wall 14, change into a position that runs perpendicularly downwards and parallel to the side wall 14. This end portion of the guideways 24 is denoted by the reference number 26. In the assembled state of the storage pocket 10, the upper guide pins 20 of the pressure element 18 lie in the guideways 24 and are slidingly guided therein. The lower guide pins 22 of the pressure element 18 engage in the assembled state of the storage pocket 10 through slots 28, which are arranged in the lower part of the end wall 16 of the base part 12.

At the lower guide pins 22, the pressure element 18 is slidingly guided with a pair of pivoting levers 30 on a circular arc portion around pivot pins 32. The pivot pins 32 are arranged projecting outwards on the outside of the end walls 16 below the guideways 24 and close to the side wall 14. The slots 28 in the lower region of the end walls 16 run in the form of a circular arc around the pivot pins 32. It is possible to guide the pressure element 18 by means of the sliding of the lower guide pins 22 slidingly in the slots 28 in the lower region of the end walls 16. In the exemplary embodiment illustrated, the slots 28 in the lower region of the end walls 16 have no guide function. Their purpose is exclusively to allow the passage of the lower guide pins 22 through the end walls 16 of the base part 12 in order to guide the pressure element 18 at its lower guide pins 22 on the outside of the end walls 16 of the base part 12 by means of the pivot levers 30 arranged there.

The storage pocket 10 also has two force-applying spring elements 34, which press the pressure element 18 towards the side wall 14. In the exemplary embodiment illustrated, helical torsion springs 34 having one short and one long limb 36, 38 are used as force-applying spring elements 34. The helical torsion springs 34 are arranged on the outside of the end walls 16 of the base part 12. The helical torsion springs 34 are placed on short, tubular spring holders 40, which are mounted on the outside of the end walls 16. With their short limbs 16, the helical torsion springs 34 are supported at a reinforcing rib 42 of the end walls 16, and with their long limbs 38 the helical torsion spring 34 engage the upper guide pin 20 of the pressure element 18 and press this towards the side wall 14.

Figure 2:
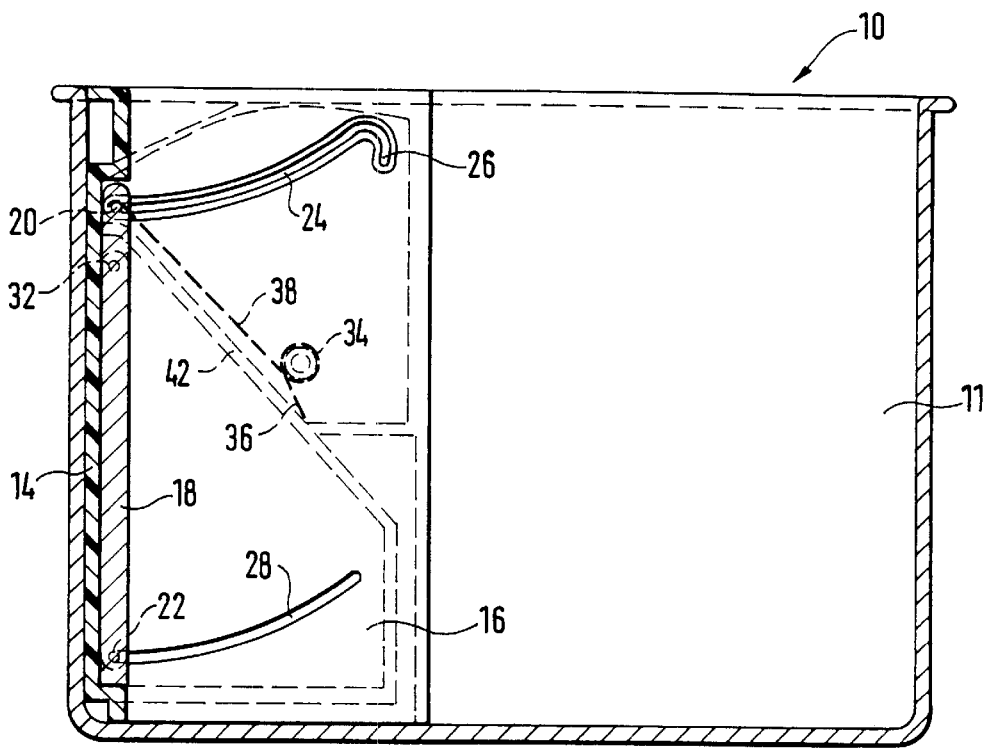
FIGS. 2 to 4 show a cross-sectional view of the storage pocket of FIG. 1 in its assembled state in different positions.

In the side wall 14, a rectangular recess 44, in which the pressure element 18 is let-in flush in an unused position, as shown in FIG. 2. To be able to get hold of the pressure element 18 in the unused position, the recess 44 has a grip opening 46 in the middle of its upper side.

The storage pocket 10 according to the invention is provided in the illustrated exemplary embodiment as an insert for the larger container 11. It is inserted in the container with the side wall 14 of its base part 12 lying flat against a side wall of the container 11, the end walls 16 of the base part 12 of the storage pocket 10 abutting adjacent side walls of the container 11.

The function of the storage pocket 10 according to the invention is explained below with reference to FIG. 2 to 4.

Figure 3:
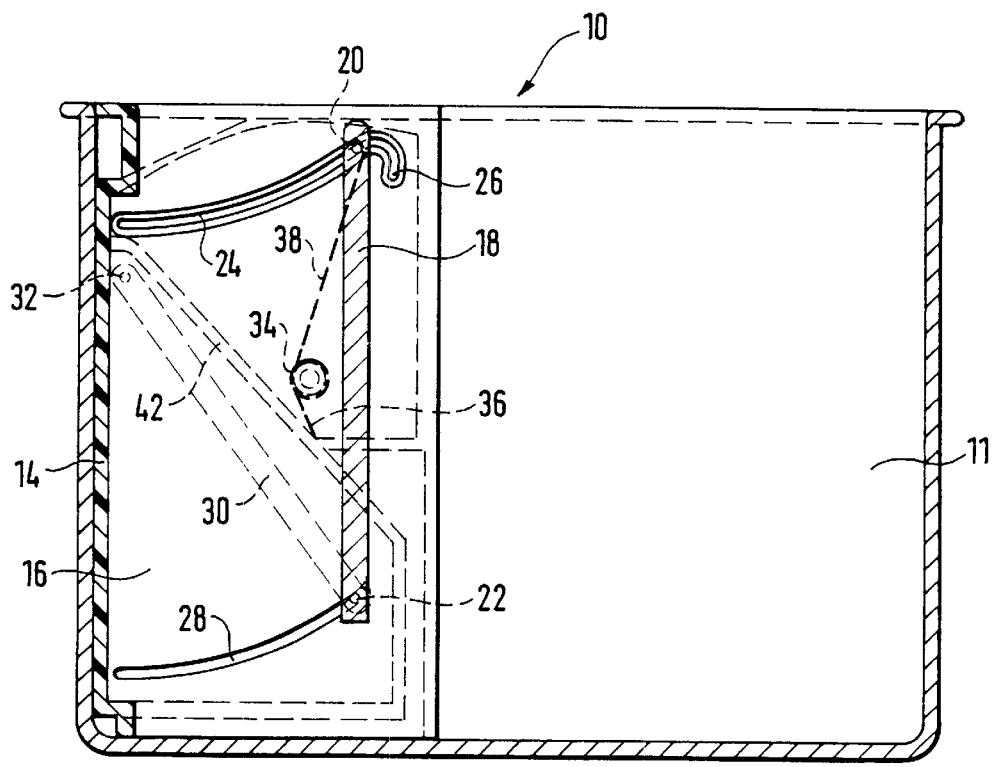
Figure 4:
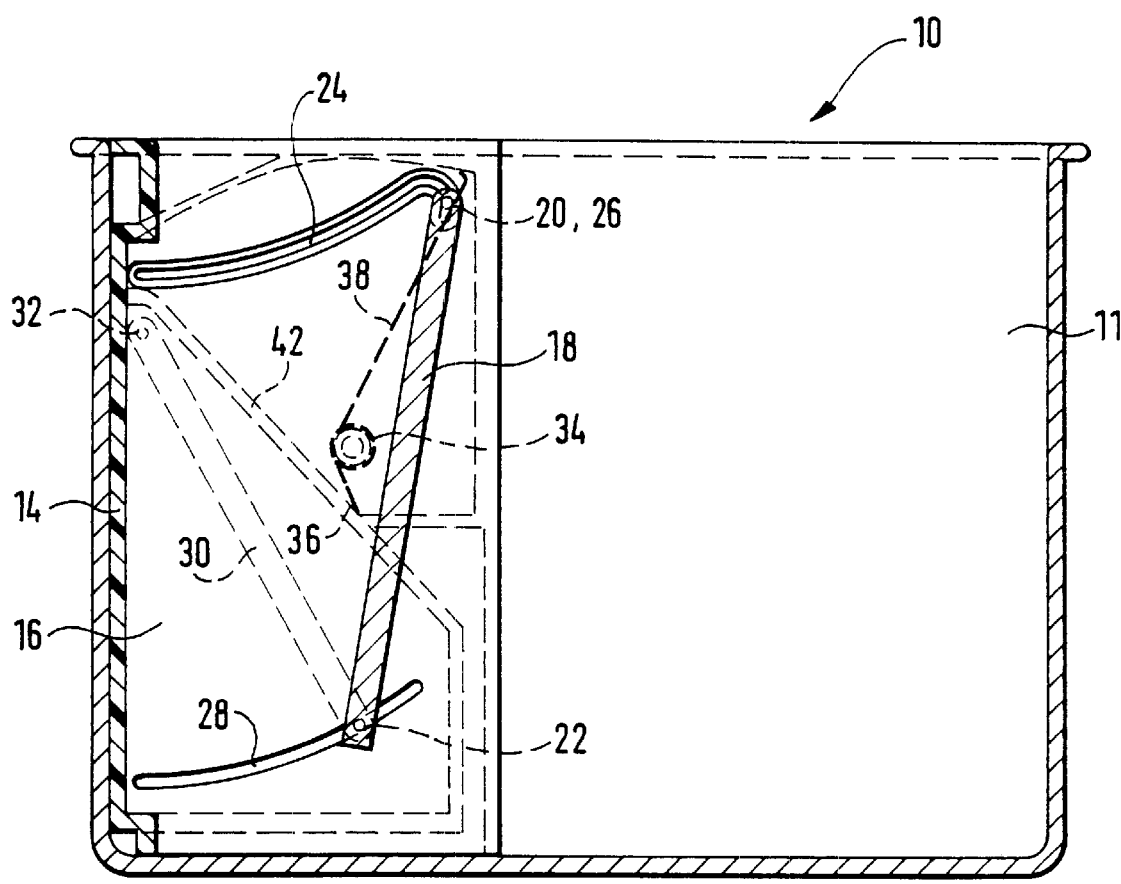

To insert road maps or street plans in the storage pocket 10, its panel-shaped pressure element 18 is gripped through the grip openings 46 in the base part 12 and moved against the spring force of the helical torsion springs 34 away from the side wall 14 through the position shown in FIG. 3 to the position shown in FIG. 4 in which it is spaced from the side wall 14. During this movement, the pressure element 18 is movably guided at the top in the guideways 24 and at the bottom by means of the pivot levers 30. On movement of the pressure element 18 from the unused position shown in FIG. 2 into the intermediate position shown in FIG. 3, just before transition into the perpendicularly downwardly extending end portions 26 of the guideways 24 the pressure element 18 is displaced parallel to the side wall 14. At the end of the movement, the pressure element 18 is displaced parallel to the side wall 14. At the end of the movement, the pressure element 18 is pressed downwards into the two perpendicularly extending end portions 26 of the guideways 24, wherein a lower edge of the pressure element 18 guided at the lower guide pins 22 by means of the pivot levers 30 moves a short distance back towards the side wall 14. In so doing, the pressure element 18 takes up an oblique position, as is apparent from FIG. 4. In this end position of the pressure element 18 spaced from the side wall 14 and shown in FIG. 4, the upper guide pins 20 of the pressure element are located in the end portions 26 of the guideways 24, these end portions 26 of the guideways 24 extending substantially perpendicularly to the direction of action of the helical torsion springs 34 and consequently holding the pressure element 18 in the position spaced from the side wall.14 against the force of the helical torsion springs 34.

With their perpendicularly extending end portions 26, the guideways 24 form a holding means, likewise denoted by the reference number 26, for the pressure element 18 in its end position spaced from the side wall 14. In this end position, the pressure element 18 can be let go, and the road maps or street plans to be inserted can be inserted between the pressure element 18 and the side wall 14 into the storage pocket 10. Following that, the pressure element 18 is raised a little way, so that it is upper guide pins 20 come out of the perpendicular end portions 26 of the guideways 24 the pressure element 18 is then pressed by the helical torsion springs 34 against the road maps and street plans, not shown, inserted in the storage pocket 10 and holds these gripped between the pressure element 18 and the side wall 14. Since the pressure element 18 automatically remains in its end position shown in FIG. 4, in which it is spaced from the side wall 14, and can be let go, insertion of the road maps or street plans with one hand is easily possible.

It will be understood that each of the elements described above, or two or more together, may also find a useful application in other types of constructions differing from the types described above.

While the invention has been illustrated and described as embodied in storage pocket (map wallet), it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A storage pocket for storing items in a motor vehicle, comprising a substantially vertical support for flat items; a pressure element having an upper end and a lower end; guide means provided for guiding said pressure element back and forth between a substantially upright position close to said support or abutting said support and a substantially upright position spaced from said support, said guide means including an upper guide in which said upper end of said pressure element is guided and a lower guide in which said lower end of said pressure element is guided, said upper and lower guides being spaced from one another in a vertical direction and extending substantially transversely to the vertical direction; a force-applying spring element which presses said pressure element toward said substantially vertical support; and a holding device which holds said pressure element against a force of said force-applying spring element in said position spaced from said support, said upper guide being formed as an arc and having a first portion extending substantially transverse to said vertical direction, and a second portion extending from said first portion downwardly to form said holding device, so that when said upper end of said pressure element engages in said second portion of said upper guide it is held against a force of said force-applying spring element in said position spaced from said support, said lower guide being formed as a circular arc.

* * * * *